Figure 1:
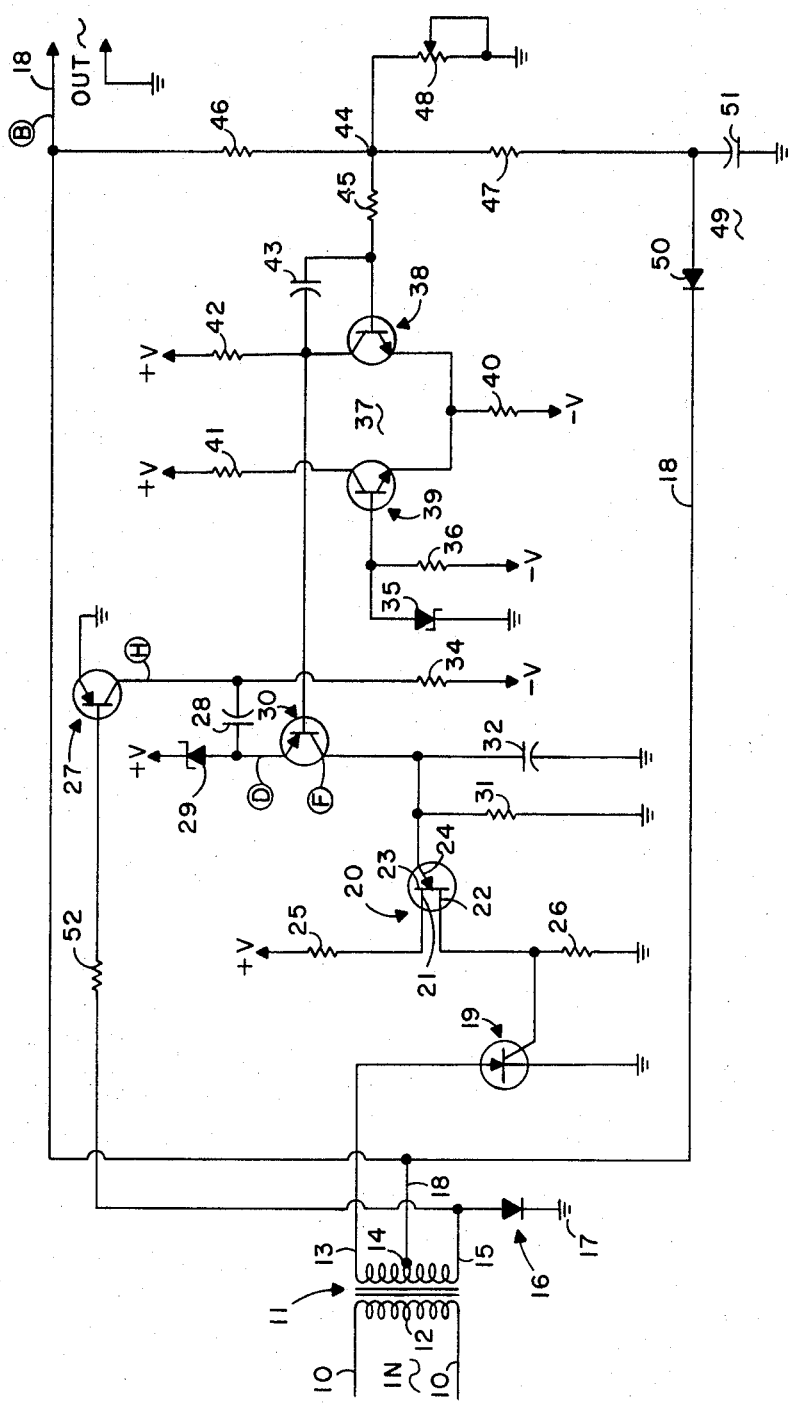

United States Patent

[11] 3,573,604

| [72] | Inventor | Michael W. Lundgreen<br>Cedar Rapids, Iowa |
|---|---|---|
| [21] | Appl. No. | 515 |
| [22] | Filed | Jan. 5, 1970 |
| [45] | Patented | Apr. 6, 1971 |
| [73] | Assignee | Collins Radio Company<br>Cedar Rapids, Iowa |

[54] RMS AC VOLTAGE REGULATOR
11 Claims, 2 Drawing Figs.

[52] U.S. Cl. .................................................. 321/18,
321/47, 323/22SC, 323/25, 323/38
[51] Int. Cl. ........................................................ H02m 1/08,
H02m 7/20, H02p 13/26
[50] Field of Search .......................................... 321/2, 16,
18, 43, 47; 323/(Termadrex), 4, 9, 16—26, 22
(SCR), 23, 25, 38

[56] References Cited
UNITED STATES PATENTS

| 3,440,517 | 4/1969 | Page et al. ..................... | 321/18 |
| 3,461,375 | 8/1969 | Nestler et al.................. | 321/47X |
| 3,470,451 | 9/1969 | Arase ............................ | 321/18 |
| 3,501,771 | 3/1970 | Miller et al. .................. | 323/22(SCR) |

*Primary Examiner*—Gerald Goldberg
*Attorneys*—Richard W. Anderson and Robert J. Crawford ABSTRACT: An RMS voltage regulator is realized in a minimal hardware circuitry by employing a unijunction switch to fire a silicon controlled rectifier element, the latter serving to convert a half-wave rectification of AC line voltage to a full-wave operation at intervals defined by RMS variation of the output from nominal. Peak and average values of the output are sensed, combined in ratio, and compared with a reference DC voltage to control the periodicy of SCR firing in a manner to cause average and peak output values to move oppositely, thus attaining a substantially constant output RMS value.

INVENTOR.
MICHAEL W. LUNDGREEN
BY R.W. Anderson
AGENT

RMS AC VOLTAGE REGULATOR

This invention relates generally to voltage regulators and more particularly to a type of regulator maintaining a substantially constant RMS output voltage in response to an AC input voltage the peak value of which varies with respect to a nominal value.

Electronic equipment employing vacuum tubes with heaters generally have AC filament power supplied by a transformer from an alternating current line. In some equipments it is desirable to maintain the filament voltage with a predetermined percentage of a nominal value to improve performance and tube life. This problem becomes apparent when the AC line voltage may vary plus or minus 10 percent.

RMS voltage values have been regulated by two general methods the first of which is to rectify the alternating current voltage into a DC voltage and regulate the DC voltage. A second approach has employed a silicon control rectifier-type of regulator together with RMS sensor of a temperature sensing type, it being understood that the RMS value is a measure of power and hence heat dissipation.

The employment of a conversion from an alternating current to DC followed by regulation disadvantageously requires a large capacitor on the output of the rectifier to reduce ripple into the subsequent regulating circuitry. The AC to DC rectifier/regulator approach further requires a large choke on the output of the rectifier when a high value of current is required and a further disadvantage is realized in the power loss in the DC regulator.

The employment of a phased-controlled silicon-controlled regulator presents disadvantages of generating radio frequency interference by the silicon-controlled rectifier element or elements when these elements are triggered other than at the zero crossings of the alternating current voltage. Further, the phase-controlled silicon-controlled regulator approach presents difficulties in providing a true RMS voltage sensor which is insensitive to ambient temperature to control the phase angle firing point of the silicon-controlled rectifier.

The present invention has as a primary object of the provision of an RMS AC voltage regulator by means of which a constant RMS output voltage is attained by employing a unique and simple RMS sensor to essentially vary the trigger frequency of a silicon-controlled rectifier-controlled element.

A further object of the present invention is to provide an RMS AC voltage regulator circuitry of the type employing a silicon-controlled rectifier-controlled element wherein the control is attained not by phase control of the silicon-controlled rectifier but by varying the periodicity of firing of the silicon-controlled rectifier in a synchronized relationship with the alternating current input voltage such that the silicon-controlled rectifier may fire only at the time of a zero crossing of the alternating current input signal.

The present invention is featured in the provision of a control means whereby the input alternating current signal is converted to an output signal of relatively constant RMS value wherein said output signal varies in form factor between a half-wave rectified alternating current voltage and a full-wave rectified alternating current voltage as the input line varies below and above a nominal value respectively.

A further feature of the present invention is the inclusion of a unique RMS voltage sensor with a voltage-controlled rectifier circuit such that the average DC voltage of the output signal and the peak voltage of the output signal move in opposing directions with variations in input line voltage, thereby maintaining a constancy as concerns the RMS or effective value of the output voltage.

Figure 2:
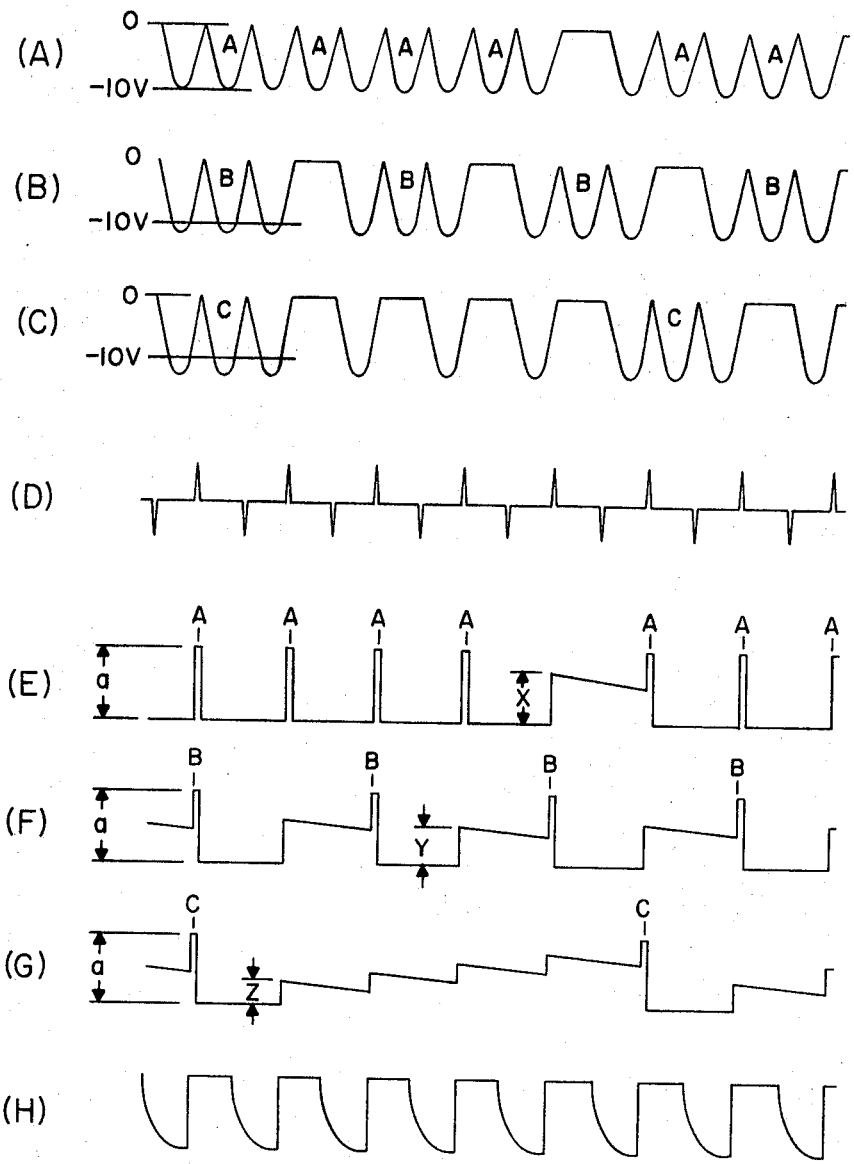

These and other features and objects of the present invention will become apparent upon reading the following description with reference to the accompanying drawings in which:

FIG. 1 is a schematic diagram of an embodiment of an RMS regulator circuitry in accordance with the present invention, and FIG. 2 is a diagrammatic representation of operational waveforms of the embodiment of FIG. 1.

In essence the regulator in accordance with the present invention converts an alternating current supply signal into a pulsating DC signal in the form of a modified half-wave rectified alternating current signal. RMS or effective output signal from the power standpoint is effected by variation in the output waveform by essentially inserting half-wave pulses at predetermined intervals into a classical half-wave rectified AC signal waveform to establish a nominal or reference condition.

The number of "missing" half-wave rectification components is increased as line voltage falls beneath the nominal and decreased as the line voltage rises above the nominal. As will be further described, this control uniquely results in an output voltage waveform the average value of which decreases as the peak value increases. In accordance with the present invention the average and peak values of the output waveform are employed in a monitoring circuitry which effectively determines zero-crossing synchronous firing times of a silicon-controlled rectifier switching element with respect to the input signal whereby predetermined half-cycles of the input signal are applied to the output line to increase the average value with decreasing input peaks values, and to decrease the average value of the output waveform as the input peaks rise above a nominal point.

Generally, a silicon-controlled rectifier and a diode member are employed as respective unilateral conduction devices in circuit with a center-tapped transformer. When the silicon-controlled rectifier is "fired," the output is a full-wave rectified waveform. When the silicon-controlled rectifier is not fired, the output is a half-wave rectified waveform. Waveform control is effected by sensing output RMS variation from a reference and synchronously controlling the firing of the silicon-controlled rectifier to periodically convert to full-wave rectification mode. This operation may be contemplated by a brief reference to waveforms A, B, and C of FIG. 2. Waveform B illustrates the nominal output voltage waveform. Note that waveform B, in the absence of the negative going half-cycle increments identified by the letters B, constitutes a half-wave rectified alternating current signal of a predetermined peak value. In accordance with the present invention the nominal waveform is modified from a half-wave rectified alternating current voltage waveform by the addition of synchronous intervals of half-cycle increments B. It is apparent then that waveform B represents a given average value and exhibits a nominal peak output voltage thereby defining a nominal RMS value.

Now considering waveform A, where input peak voltage has fallen from nominal, it is noted that proportionally more half-cycle increments are synchronously added to the classical half-wave rectified AC signal as indicated by the half-cycle pulsations identified by letters A. Within the time interval depicted in FIG. 2 proportionally more half-cycle increments are added to the classical half-wave rectified AC voltage waveform, thus increasing the average value, though the peak value is less.

Referring to waveform C of FIG. 2, the output is seen to be in the form of a classical half-wave rectified alternating current voltage with the periodic inclusion of half-wave pulses C in synchronous fashion in response to the peak value of the input signal rising above the nominal value. Thus waveform C depicts a peak value in excess of the nominal value of waveform B, but defines an average value which is less than nominal.

The present invention thus provides an RMS control by controlling the waveform such that a peak value increase is accompanied by a decrease in average value, thus tending to maintain a constant effective or RMS value. As will be further described, the insertion of the "missing" half-wave intervals A, B, and C into the waveforms A, B, and C is under the control of a silicon-controlled rectifier in circuit with the supply transformer so as to selectively provide a ground path for the transformer secondary such that the waveforms increments A, B, and C are included in a synchronous fashion in the output waveform. The circuitry to be described thus fires the silicon-controlled rectifier switching element at time determined by a monitoring of the peak and average values of the output waveform as compared to a reference.

With reference to FIG. 1, the present invention employs an input transformer 11 to which the line alternating current signal 10 is applied. The transformer secondary winding has a center tap 14 and first and second end terminals 13 and 15 respectively. The output of the regulator circuitry comprises the signal between the center tap 14 and ground 17. Therefore, assuming silicon-controlled rectifier 19, which is connected between the upper terminal 13 of transformer 11 and common ground is in a nonconductive state and represents a high impedance, the output 18 of the present invention would comprise a negative-going half-wave rectifier alternating current signal. The modification of this classical half-wave rectified signal is in general effected by selectively grounding terminal 13 of transformer 11 at times when the input signal 10 is phased such that the lower terminal 15 of the transformer secondary winding is not grounded due to a reverse bias on rectifying diode 16. The control to be defined is the means by which silicon-controlled rectifier 19 is fired to add "missing" pulses into what would otherwise be a classical half-wave rectified signal as developed on the center tapped of the transformer.

Terminal 15 of transformer 11 is applied through resistor 52 to the base of a transistor 27 which functions to generate a square wave in synchronism with the line voltage 10 (waveform H, FIG. 2). The collector of transistor 27 is connected through a resistor 34 to a negative supply source and through a capacitor 28 to the emitter of transistor 30. The emitter of transistor 30 is additionally applied through diode 29 to a positive supply voltage source. The square wave H appearing at the collector of transistor 27 is differentiated by the combination of capacitor 28 and diode 29 to cause transistor 30 to furnish current impulses from its collector electrode in time coincidence with the zero crossings of the applied line voltage 10. Waveform D of FIG. 2 illustrates the differentiated collector output signal of transistor 27. The collector output of current amplifier 30 thus supplies charging pulses to capacitor 32 which forms a part of a relaxation oscillator comprised of a unijunction transistor 20 and resistors 25, 26, and 31. Unijunction transistor 20 produces a pulse on control electrode 22 thereof when the charge on capacitor 32 in its emitter or control element circuit reaches a predetermined magnitude. Thus a pulse is developed across resistor 26 and applied to the control electrode of the silicon-controlled rectifier 19 each time the unijunction transistor 20 is fired. In a known manner the unijunction transistor 20, when fired, provides a low impedance path to ground to rapidly discharge capacitor 32. Thus transistor 27, transistor 30, capacitor 32 and unijunction transistor 20 collectively serve as a means generating impulses to fire silicon-controlled rectifier 19 which will be time coincident with a zero crossing of the input line signal 10. The frequency of operation of the relaxation oscillator comprising the transistor 20 is determined then not by how many impulses from transistor 30 are applied to charge capacitor 32 (since these occur once during each cycle in synchronism with the input line signal 10) but, in accordance with the present invention, upon how much charge is effected during these synchronous intervals. The rate at which capacitor 32 charges to the firing threshold of unijunction transistor 20 is controlled by transistor 30 which functions as a current amplifier or current source the current supplying capability of which is in turn controllable by RMS monitoring circuitry to be now described.

Current source transistor 20 is controlled by the output of a summing amplifier generally designated by reference numeral 37. Summing amplifier 37 is comprised of first and second transistors 38 and 39. The collector electrodes of transistors 38 and 39 are connected through resistors 42 and 41, respectively, to a positive DC source voltage. The emitters of transistors 38 and 39 are connected together and through a transistor 40 to a negative voltage source. The base of current amplifier 30 is connected to the collector of transistor 38. The collector and base of transistor 38 are interconnected by a large value capacitor 43 and through a resistance 45 to a summing point 44. The base of transistor 39 is connected through a resistor 36 to a negative DC voltage source and through a reference diode 35 to ground so as to establish a reference DC voltage on the base thereof.

The output signal 18 is applied through a resistor 46 to a summing point 44. Summing point 44 receives a second signal through resistor 47 corresponding to the peak value of the output signal. This peak is taken from the junction of capacitor 51 and diode member 50. Capacitor 51 is large and charges to the peak of the output 18. Thus summing point 44 receives a first signal proportional to the peak of the output 18 and a second signal comprising the output per se. A variable resistor 48 is additionally connected to summing point 44 and to ground to provide a means for adjusting the RMS output voltage. The summation developed at point 44 is applied to the summing amplifier 37. Capacitor 43 effects an averaging of the line signal component applied and thus the sum of the output peak and output average signals is compared to the reference established by Zener diode 35. The collector of transistor 38 is connected to the base of current source 30 and thus the magnitude of the synchronous charging current impulses delivered to capacitor 32 in the unijunction oscillator is determined by the output of amplifier 37 which is a measure of RMS variations from nominal.

Waveforms E, F, and G of FIG. 2 illustrate the control of the period of oscillation of the unijunction transistor oscillator as a function of the magnitude of the current pulses applied by current source 30 (this magnitude in turn being controlled as a function of the variation of the output voltage from a nominal RMS value).

Waveform F depicts the nominal situation. Waveform F, which represents the collector voltage of the current source transistor 30 and thus the charge on capacitor 32, shows the charge reaching a predetermined level $a$, corresponding to the firing threshold of unijunction transistor 20, at points identified in time by the letters B. A cross reference between waveform F and output waveform B for the nominal condition indicates that the input signal half-cycles periods following the time occurrence of the firing of the unijunction transistor are those periods during which an additional half-cycle of the line voltage is present in the output, since it is at these zero crossovers that unijunction transistor 22 fires to trigger silicon-controlled rectifier 19 and thus ground terminal 13 of the secondary winding of supply transformer 11.

Waveform E depicts a situation of low line voltage where the peak signal is less (by, for example, 10 percent) than that defined for the nominal condition. In this instance it is noted that the current source 30 is rendered capable under the influence of the summing amplifier 37 to supply a charge to capacitor 32 in excess of unijunction threshold level $a$ during several successive charging impulses such that unijunction transistor 20 fires successively to insert a half-cycle interval A in output waveform A. A point in time is illustrated when the charging impulse is not sufficient to fire the unijunction transistor (i.e. the line peak may have risen since the preceding pulse time). Now the charge delivered by the current source 30 during the following impulse is added to that present on capacitor 32 at the instant in time, and the total charge exceeds threshold $a$ to again fire the unijunction and insert a synchronous half-cycle in the output. The nominal condition of waveform F indicates a charge of amplitude $y$ being applied during each zero crossover of the line voltage which is less than the charge $x$ supplied for the low line condition of waveform E and greater than the charge Z effected during the high line condition of waveform G. Thus, under conditions of line voltage above nominal, the charge on capacitor 32 bleeds off during successive intervals such that it takes several successive charging impulses to that point in time where the addition of charging impulse to the existing voltage on capacitor 32 is sufficient to exceed the threshold $a$ of unijunction transistor 20.

SUMMARY OF OPERATION

If the silicon-controlled rectifier 19 were never fired, the output 18 would be a negative-going half-wave rectified sine wave.

If then the silicon-controlled rectifier 19 fires at some given zero crossover of the input line voltage 10, a ground return is provided for terminal 13 of the secondary of transformer 11, and the ensuing one-half cycle of the line voltage is properly phased to be passed to the output line 18 thus "filling in" a missing one-half cycle in an otherwise classical half-wave output waveform.

Transistor 27 develops a square wave output which is subsequently differentiated to render conductive the current source transistor 30 for brief impulses or intervals at each occurrence of successive zero crossings of the input signal 10. The amount of charge supplied by the current source transistor 30 to the relaxation oscillator including the unijunction transistor 20 is in turn defined by the output of summing amplifier 37 which controls current amplifier transistor 30 in accordance with the comparison between the sum of the peak and average values of the output signal and a reference or nominal signal.

Capacitor 32 in the relaxation oscillator discharges between successive zero-crossing synchronous charging impulses supplied by transistor 30 at a rate determined by the time constant defined by capacitor 32 and resistor 31, unless the impulse fires unijunction transistor 20, in which case capacitor 32 is rapidly discharged. The threshold or firing level of the unijunction transistor will thus always be attained at the time occurrence of a zero crossover of the input signal since the charging impulse is time synchronous therewith. The silicon controlled rectifier 19 is then in turn fired at the time occurrence of the firing of the unijunction transistor 20 since firing of the unijunction transistor 20 occurs at a time when the anode of silicon controlled rectifier 19 is positive with respect to the cathode; that is, the phasing of the firing impulse from the unijunction transistor 20 is proper as compared to the phase of the line signal developed in the transformer secondary, to effect a firing of the silicon controlled rectifier 19 at the proper time interval. The firing of the silicon controlled rectifier 19 is maintained for the period of the ensuing half-cycle of the input voltage until the anode goes negative with respect to the cathode. Thus a complete "missing" one-half cycle of the input alternating current signal is applied in supplementary fashion to the output waveform to increase the average value thereof.

Nominal operation to effect a reference or nominal RMS value of the output waveform is set by means of resistor 48 at the summing point of the peak and average output signals. Variation in input peak level effects a change in output average value to maintain the output RMS essentially constant over a predetermined percentage variation in the input voltage level.

The control is such that, as the line voltage peaks increase, the output peaks correspondingly rise, but the control circuitry reduces the amount of charge to the relaxation oscillator capacitor 32 such that correspondingly more successive charging impulses are necessary to raise the potential on capacitor 32 to the unijunction transistor firing level. Thus the silicon controlled rectifier 19 fires less times to "insert" fewer one-half cycle impulses into the output waveform and the average of the output falls. The reduction of output average signal with increase in output peak level holds the RMS or effective value essentially constant.

Thus it is realized that a constant RMS output signal is attained by means of a novel RMS sensor circuitry employing the monitoring of the summation of peak and average voltage output levels in proper ratio.

Although this invention has been described with respect to a particular embodiment thereof, it is not to be so limited as changes might be made therein which fall within the scope of the invention as defined in the appended claims.

I claim:

1. A voltage regulator for maintaining a substantially constant RMS output voltage in response to an alternating current input voltage the RMS value of which varies with respect to a nominal value, comprising rectifying means receiving said input signal and providing a signal output to an output line, said rectifying means being adapted to operate as a half-wave rectifier in a first operational mode and as a full-wave rectifier in a second operational mode, means for periodically effecting said second operational mode of said rectifying means, said last named means comprising means sensing the peak value of said output voltage, means sensing the average value of said output voltage, means combining said peak and average voltages and comparing the combined signal to a reference signal, control signal development means responsive to the output of said comparison means, said control means periodically effecting said second rectifier operational mode as a function of the deviation of said combined signal from said reference, said second rectifier operational mode being effected with a periodicy which is a function of said control signal, said rectifying means comprising a center tapped secondary winding of a transformer the primary winding of which receives said input signal, said output line being connected to the center tap of said secondary winding and referenced to common ground, one end of said secondary winding being connected to a first unilateral conduction device to common ground, the other end of said secondary winding being selectively connectable through a normally disabled second unilateral conduction device to common ground, said control means effecting a selective enablement of said second unilateral conduction device in response to which said second rectifier operational mode is effected, whereby a rise in output peak voltage is accompanied by a corresponding decrease in average output voltage and the RMS value of said output voltage is held substantially constant over a predetermined range of variation of said input signal.

2. A regulating means as defined in claim 1 wherein said unilateral conduction device is a silicon-controlled rectifier including an anode and cathode electrode connected in circuit between said second secondary winding and common ground, the output from said control means being adapted to provide synchronous pulses to fire said silicon-controlled rectifier during predetermined ones of alternate half-cycles of said input signals, whereby said predetermined half-cycles are conveyed to said output line.

3. A regulating means as defined in claim 1 wherein said means for combining said output voltage peak and average values comprises means summing said peak and average output signals in a predetermined ratio to establish the nominal output RMS value of said output signal.

4. A voltage regulator as defined in claim 2 wherein said control means comprises a signal integrating means to which charging impulses are synchronously applied, the magnitude of said charging impulses being a function of the discrepancy between the RMS value of said output signal and said reference, a trigger circuitry receiving said charging impulses and being effective to develop a firing impulse for application to said silicon-controlled rectifier upon said integrating means charging to a predetermined voltage level.

5. A regulating means as defined in claim 4 including means responsive to said input signal to develop a train of enabling pulses time coincident with successive alternate zero crossings of said input signal, said control means including means responsive to the variation of the RMS value of said output signal from said nominal value to determine the current generating capability of a current generating means, said current generating means being rendered operable during the time occurrence of said periodic impulses, said integrating means being connected to said current generating means and thereby charging to a predetermined value after the time occurrence of a predetermined number of said charging impulses the pulse magnitudes and periodicy of which are proportional to the RMS value of said output signal.

6. A regulating means as defined in claim 5 wherein said control means is effective in firing said silicon-controlled rectifier at a rate synchronous with alternate ones of said input signal half-cycles, said rate being an inverse function of the peak value of said output signal whereby said peak and average values of the output signal vary from nominal values thereof in respective opposing directions.

7. A regulating means as defined in claim 5 wherein said RMS sensing means comprises a summing amplifier including first and second amplifying stages in a summing amplifier configuration, said RMS reference signal being applied as input to its first one of said stages, the peak and average values of said output signal being applied in summation as input to a second one of said stages, and the output from said summing amplifier being applied to said current generating means to establish the current generating capabilities thereof during those periods when said current generating means is rendered operable.

8. A voltage regulating means for producing a substantially constant RMS output voltage in response to an alternating current input voltage the peak value of which varies with respect to a nominal value, comprising signal transforming means including a primary winding receiving said alternating current input signal, a secondary winding including a center-tap terminal and first and second end terminals, said first end terminal being connected through a first unilateral conduction device to ground, said second terminal being connectable through a normally disabled second unilateral conduction device to ground, an output signal taken between said center-tap terminal and ground, means for selectively enabling said second unilateral conduction device comprising means for developing a signal proportional to the peak amplitude of said output signal, means for developing a signal proportional to the average of said output signal, control means responsive to the deviation of the summation of said peak and average signals from a reference signal to render said second unilateral conduction device operational at predetermined time intervals within the time defined by alternate half-cycles of said input signal whereby at least predetermined portions of said alternate half-cycles appear on said output line, the periodicy of said enablement being a function of the discrepancy of the RMS values of said output signal from a nominal reference.

9. A regulating means as defined in claim 8 wherein said peak and average output signals are summed in a predetermined ratio to establish the nominal output RMS reference of said output signal.

10. A regulating means as defined in claim 8 wherein said second unilateral conduction device comprises a silicon-controlled rectifier the anode and cathode electrodes of which are serially connected between said transformer secondary winding second terminal and ground, said control means developing a firing impulse for said silicon-controlled rectifier during those alternate ones of half-cycles of said input signal when the anode electrode of said silicon-controlled rectifier is positive with respect to the cathode electrode thereof.

11. A voltage regulator as defined in claim 10 wherein said control means comprises a signal-integrating means to which charging impulses are synchronously applied, the magnitude of said charging impulses being a function of the discrepancy between the RMS value of said output signal and said reference, a trigger circuitry receiving said charging impulses and being effective to develop a firing impulse for application to said silicon-controlled rectifier upon said integrating means charging to a predetermined voltage level.